United States Patent
Stone

(10) Patent No.: US 11,072,470 B2
(45) Date of Patent: Jul. 27, 2021

(54) DIESEL EXHAUST FLUID TANK WITH INTEGRATED MIS-FILLING PREVENTION DEVICE

(71) Applicant: Donaldson Company, Inc., Minneapolis, MN (US)

(72) Inventor: Stephen A. Stone, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 81 days.

(21) Appl. No.: 16/253,061

(22) Filed: Jan. 21, 2019

(65) Prior Publication Data
US 2019/0225391 A1 Jul. 25, 2019

Related U.S. Application Data

(60) Provisional application No. 62/619,999, filed on Jan. 22, 2018.

(51) Int. Cl.
*B60K 15/03* (2006.01)
*B65D 51/24* (2006.01)
(Continued)

(52) U.S. Cl.
CPC ......... *B65D 51/24* (2013.01); *B01D 53/9431* (2013.01); *B29C 41/04* (2013.01);
(Continued)

(58) Field of Classification Search
CPC ............ B65D 51/24; B60K 2015/0458; B60K 2015/0483; F01N 2610/02; B29K 2995/0008
See application file for complete search history.

(56) References Cited

U.S. PATENT DOCUMENTS 5,300,156 A * 4/1994 Mohri .................. H01F 1/0578
148/104
2003/0043688 A1* 3/2003 Peterson ................. B01F 5/106
366/137
(Continued)

OTHER PUBLICATIONS

APEX magnets web site: https://www.apexmagnets.com/news-how-tos/how-temperatures-affect-neodymium-magnets/ ; Aug. 17, 2020 ; 3 pages.*

(Continued)

*Primary Examiner* — Stephen J Castellano
(74) *Attorney, Agent, or Firm* — Fredrikson & Byron, P.A.

(57) ABSTRACT

A diesel exhaust fluid (DEF) storage system may include a reservoir body having a magnet integrally formed about an inlet opening of the reservoir body. For example, the magnet may be molding about a perimeter of the inlet opening during a molding process in which the reservoir body is formed. In some examples, the inlet opening defines a lumen extending into an interior of the reservoir body with the magnet being positioned at a location along the lumen opposite an external end face. The position of the magnet may be effective to engage a corresponding magnet on a DEF fill nozzle, allowing DEF to be introduced into the reservoir body. By integrating the magnet into the reservoir body, protection features that prevent erroneous filling of the reservoir body cannot be removed or bypassed.

20 Claims, 4 Drawing Sheets

(51) Int. Cl.
  *B29C 41/04* (2006.01)
  *B01D 53/94* (2006.01)
  *B29C 70/78* (2006.01)
  *B67D 7/02* (2010.01)
  *F01N 3/20* (2006.01)
  *B29K 705/02* (2006.01)
  *B29L 31/00* (2006.01)
  *B29K 705/08* (2006.01)
  *B29K 705/12* (2006.01)
  *B01D 53/90* (2006.01)

(52) U.S. Cl.
  CPC .......... B29C 70/78 (2013.01); B67D 7/0288 (2013.01); F01N 3/2066 (2013.01); *B01D 53/90* (2013.01); *B01D 2251/2067* (2013.01); *B29K 2705/02* (2013.01); *B29K 2705/08* (2013.01); *B29K 2705/12* (2013.01); *B29K 2995/0008* (2013.01); *B29L 2031/712* (2013.01); *F01N 2570/14* (2013.01); *F01N 2610/02* (2013.01); *F01N 2610/142* (2013.01); *F01N 2610/1413* (2013.01)

(56) References Cited

U.S. PATENT DOCUMENTS

| | | | | |
|---|---|---|---|---|
| 2012/0181274 | A1* | 7/2012 | Fetzer | B29C 66/12821 220/86.2 |
| 2012/0186677 | A1* | 7/2012 | Wetzel | B60K 15/03519 137/624.27 |
| 2012/0267007 | A1* | 10/2012 | Driftmeyer | B67D 7/42 141/384 |
| 2014/0139304 | A1* | 5/2014 | Wang | C25D 13/12 335/302 |
| 2017/0050753 | A1* | 2/2017 | Glock | B65B 39/12 |
| 2017/0136873 | A1* | 5/2017 | Nanyoshi | B60K 15/05 |

OTHER PUBLICATIONS

ELAFLEX Tankstellentechnik (ETT) Recent Changes and Improvments, Information 9.06E, Sep. 2006, 4 pages.

Diesel engines—NOx reduction agent AUS 32—Part 4: Refilling interface, International Organization for Standardization, Draft International Standard ISO/DIS 22241-4, 2006, 8 pages.

Diesel engines—NOx reduction agent AUS 32—Part 4: Refilling interface, International Organization for Standardization, First Edition, International Standard ISO/DIS 22241-4, Aug. 1, 2009, 18 pages.

Magnevator, Five Star DEF, available at <http://www.fivestardef.com/announcing-def-magnevator-ii>, May 28, 2015, 3 pages.

Elaflex ZVA Catalogue, available at https://www.commercialfuelsolutions.co.uk/downloads/catalogues/Elaflex-ZVA-catalogue.pdf (2008, Rev. 6 2009), 11 pages.

* cited by examiner

DIESEL EXHAUST FLUID TANK WITH INTEGRATED MIS-FILLING PREVENTION DEVICE

This application claims the benefit of U.S. Provisional Patent Application No. 62/619,999, filed Jan. 22, 2018, the entire contents of which are incorporated herein by reference.

TECHNICAL FIELD

This disclosure relates to diesel exhaust fuel tanks and, more particularly, diesel exhaust fluid tanks with mis-filling prevention devices.

BACKGROUND

Diesel fuel is a liquid fuel used in diesel combustion engines where fuel ignition takes place without any spark as a result of compression of an inlet air mixture and then injection of fuel. Diesel combustion engines generate an excess amount of nitrogen oxides ($NO_x$) compared to gasoline combustion engines, which is a harmful air pollutant. To reduce the amount of nitrogen oxide discharged to the environment, vehicles equipped with diesel combustion engines typically include a scrubber system that uses a selective catalytic reduction (SRC) catalyst and diesel exhaust fluid (DEF) to scrub nitrogen oxide from the exhaust gases. The most common DEF is an aqueous urea solution made with 32.5% urea and 67.5% deionized water. In operation, the DEF can be injected into the exhaust pipeline that is heated, causing the aqueous urea to atomize and vaporize and to decompose to form ammonia and carbon dioxide. Within the SCR catalyst, the nitrogen oxides are catalytically reduced by the gaseous ammonia into water and nitrogen, which are released through the exhaust as harmless gases.

In practice, vehicles equipped with diesel combustion engines typically include a tank to hold DEF that is separate from the larger diesel fluid tank on the vehicle. The operator can refill the DEF tank periodically as the DEF in the tank is consumed through use. For example, filling stations that supply diesel fuel, e.g., for high volume users such as off-road heavy equipment or on-road semi-trailer trucks, may include a separate DEF supply pump adjacent to a diesel fuel supply pump. The DEF supply pump can have a dispensing nozzle similar to that of a traditional diesel fuel dispensing nozzle, although the nozzle may be smaller to prevent users from filling their DEF tank with diesel fuel. The operator can refill his DEF tank using the DEF dispensing nozzle, taking care to not inadvertently fill the wrong tank with the wrong type of fluid.

SUMMARY

In general, this disclosure is directed to device, systems, and techniques related to the storage of diesel exhaust fluid (DEF). In some examples, a DEF reservoir includes a reservoir body having a magnet integrally formed about an inlet opening of the reservoir body. For example, the magnet may be molded about a perimeter of the inlet opening during a molding process in which the reservoir body is formed. In some examples, the inlet opening defines a lumen extending inwardly into the reservoir. The lumen may be co-axial with and separated by an air gap from an outlet nozzle extending from a wall surface of the reservoir. The magnet can be positioned at or adjacent the distal end of the lumen. The position of the magnet may be effective to engage a corresponding magnet on a DEF fill nozzle, allowing DEF to be introduced into the reservoir body. By integrating the magnet into the reservoir body, protection features that prevent erroneous filling of the reservoir body cannot be removed or bypassed.

In applications where the DEF reservoir is formed through a molding process, the magnet incorporated into the reservoir may be formed of a magnetic material that maintains its magnetic strength after being heated to a temperature ranging from 200 degrees Celsius to 300 degrees Celsius. For example, the magnetic strength of the magnet after being molded into the DEF reservoir may be at least 75% of the strength before being molded into the reservoir, such as at least 90% of the strength, or at least 95% of the strength. In some examples, the magnet includes dysprosium, which may improve the thermal stability/resistance of the magnet. Additionally or alternatively, in some examples, the magnet is fabricated from a magnetic material selected from the group consisting of neodymium, samarium-cobalt (SmCo), aluminum nickel cobalt (AlNiCo), and combinations thereof.

In one example, a diesel exhaust fluid storage system is described that includes a reservoir body and a magnet. The reservoir body is configured to contain diesel exhaust fluid. The reservoir body can have one or more sidewalls defining an inlet opening through which diesel exhaust fluid is configured to be introduced into the reservoir body. In addition, the reservoir body can have an outlet opening through diesel exhaust fluid is configured to be discharged from the reservoir body for supplying a diesel exhaust system. The example specifies that the magnet is integrated into the one or more sidewalls defining the inlet opening of the reservoir body.

The details of one or more examples are set forth in the accompanying drawings and the description below. Other features, objects, and advantages will be apparent from the description and drawings, and from the claims.

DETAILED DESCRIPTION

In general, the disclosure is directed to diesel exhaust fluid (DEF) reservoirs with integrated mis-filling prevention devices. The mis-filling prevention device may be implemented using one or more magnets that are positioned to magnetically interact with one or more corresponding magnets on a dedicated DEF fill nozzle. For example, the DEF fill nozzle may have a magnetically acuatable valve that is biased closed. When the DEF fill nozzle is inserted into an appropriately configured DEF reservoir, the one or more magnets integrated into the DEF reservoir can provide a magnetic force to the magnet associated with the valve on the DEF fill nozzle, causing the valve normally closing the fill nozzle to open. Accordingly, when the operator subsequently actuates a flow control device on the DEF fill nozzle, such as an actuatable handle, DEF can pass through the fill nozzle into the DEF reservoir.

In some examples, the one or more magnets are integrally molded into the DEF reservoir about an inlet nozzle of the reservoir. A magnet may be integrally molded into the DEF reservoir such that the magnet is permanently joined with the material forming the reservoir and cannot be removed without damaging or otherwise permanently altering the material surrounding the magnet. By integrating the magnet directly into the DEF reservoir, a user cannot remove or bypass the mis-filling prevention device. This can enhance compliance with the designed safety system.

Figure 1:
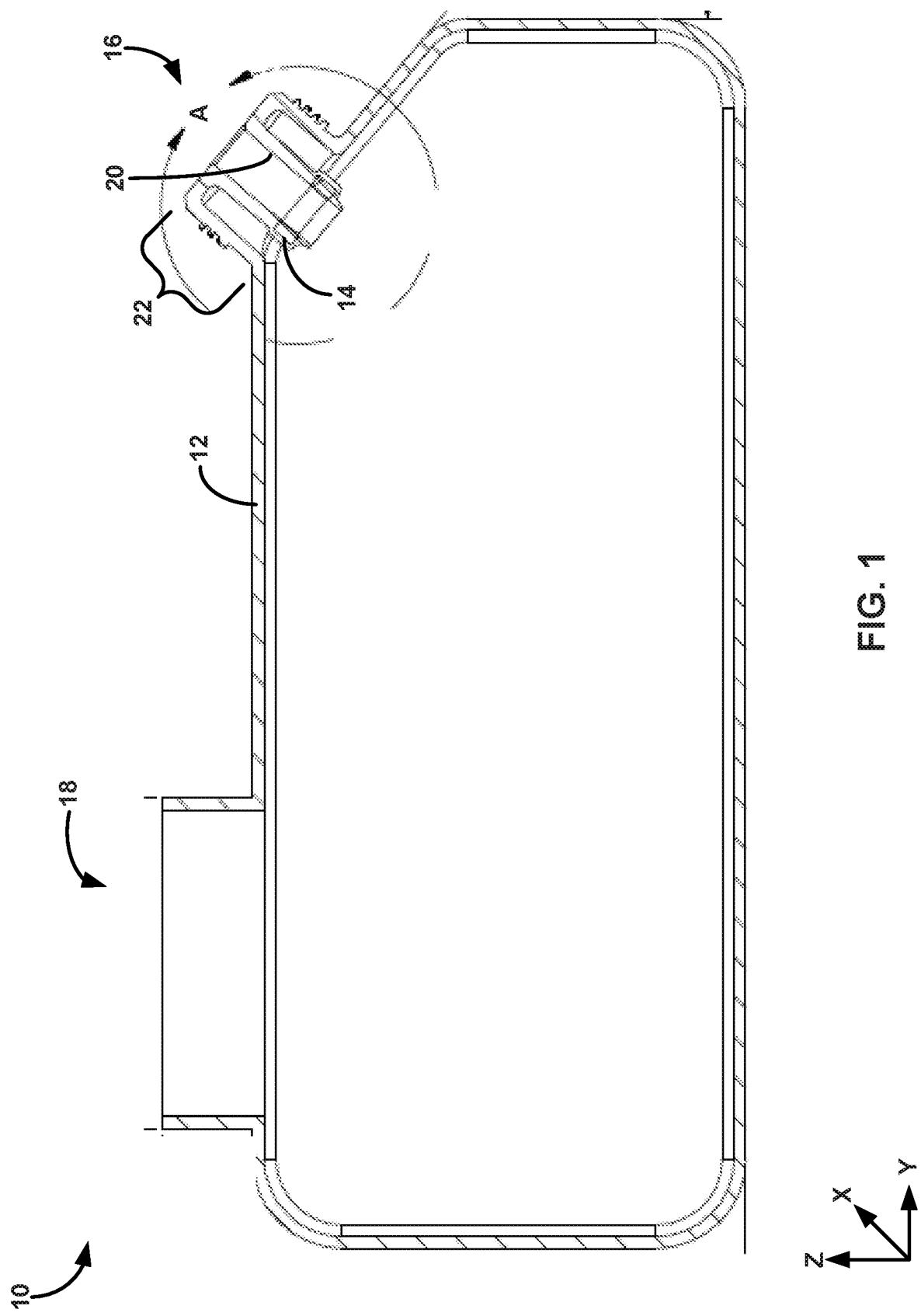
FIG. 1 is a side view of an example DEF reservoir that includes a reservoir body and magnet integrated into the reservoir body.

FIG. 1 is a side view of an example DEF reservoir 10 that includes a reservoir body 12 and magnet 14 integrated into the reservoir body. Reservoir body 12 includes an inlet opening 16 through which DEF fluid can be introduced into the reservoir for storage and subsequent use. Reservoir body 12 in the illustrated example also includes an outlet opening 18 through which DEF fluid held in the reservoir can be discharged from the reservoir and delivered to a diesel exhaust system.

For example, DEF reservoir 10 may be installed on a vehicle equipped with a diesel combustion engine with a tubing line fluidly coupling outlet opening 18 to a scrubber system that scrubs exhaust gas produced by the engine. In use, an operator can fill DEF reservoir 10 with DEF fluid. Typical DEF fluid includes urea, such as an aqueous urea solution made with 32.5% urea and 67.5% deionized water. DEF fluid stored in DEF reservoir 10 can be delivered to the scrubber system through outlet opening 18 via a connecting fluid conduit and can be injected into an exhaust pipeline, causing aqueous urea in the DEF fluid to atomize and/or vaporize and decomposes to form ammonia and carbon dioxide. While DEF reservoir 10 is illustrated as having an outlet opening 18 separate from inlet opening 16, in other configurations, the reservoir may not have a separate outlet opening. Rather, in these configurations, the operator may fill and dispense DEF fluid through a common opening (e.g., inlet opening 16).

In the configuration of FIG. 1, magnet 14 can function as a mis-filling prevention device that is positioned to interact with a corresponding magnet on a DEF fill nozzle. Accordingly, magnet 14 may be positioned at a location on the reservoir body 12 effective to magnetically interact with the magnet on the DEF fill nozzle, when the DEF fill nozzle is inserted into the inlet opening 16. As discussed in greater detail below, magnet 14 may be integrated into reservoir body 12, for example by molding the reservoir body around the magnet, such that the magnet is fixedly coupled to the reservoir body and un-removable there from.

In the example of FIG. 1, reservoir body 12 includes at least one sidewall 20 defining inlet opening 16. The number of sidewalls interconnected together to form reservoir body 12 and/or inlet opening 16 can vary depending on the shape of the reservoir body and/or inlet opening. For example, a reservoir body and inlet opening with a circular cross-sectional shape may be formed of a single sidewall whereas a reservoir with a square or rectangular cross-sectional shape may be defined by four interconnected sidewalls.

In general, reservoir body 12 and/or inlet opening 16 can define any polygonal (e.g., square, hexagonal) or arcuate (e.g., circular, elliptical) shape, or even combinations of polygonal and arcuate shapes. Reservoir body 12 can be fabricated from a material that is chemically compatible with and chemically resistant to the type of liquid intended to be placed in the reservoir. For example, reservoir body 12 may be fabricated from a material that is chemically compatible with diesel exhaust fluid. In some examples, reservoir body 12 is fabricated from a polymeric material, such as a polyethylene.

Reservoir body 12 can define any suitable size, and the specific dimensions of the reservoir body may vary depending on the volume of chemical intended to be held by the reservoir. In some configurations, reservoir body 12 defines a height (in the Z-direction indicated on FIG. 1) ranging from 150 cm to 250 cm, a width (in the X-direction indicated on FIG. 1) ranging from 250 cm to 400 cm, and a length (in the Y-direction indicated on FIG. 1) ranging from 400 cm to 700 cm. While the size of reservoir body 12 may vary, in some examples, the reservoir body is designed to hold at least 1 liter of diesel exhaust fluid, such as from 1 to 20 liters of diesel exhaust fluid, or from 5 to 15 liters of diesel exhaust fluid. Reservoir body 12 can have other sizes and capacities, and it should be appreciated that the disclosure is not limited in this respect.

As noted above, magnet 14 can be integrated into reservoir body 12 such that the magnet is inseparable from the reservoir body without permanently altering the material defining the reservoir body surrounding the magnet. Accordingly, reservoir body 12 and magnet 14 may form a unitary structure which, collectively, defines reservoir 10 that receives and holds diesel exhaust fluid. Magnet 14 can be implemented using one or more magnets (e.g., two, three, or more), e.g., positioned at inlet opening 16 of reservoir body 12.

In the illustrated example, inlet opening 16 is illustrated as defining a circular opening with magnet 14 having an annular shape. In some configurations, magnet 14 surrounds an entire perimeter of inlet opening 16 (e.g., 360 degrees). For instance, in one example, magnet 14 may define an annulus having an inner diameter ranging from 15 mm to 25 mm and an outer diameter ranging from 16 mm to 40 mm. In other configurations, magnet 14 surrounds less than the entire perimeter of inlet opening 16.

For example, magnet 14 may not be a full annulus but may instead be a partial annulus (e.g., from 45 degrees to 180 degrees). Indeed, magnet 14 may not even have an annular shape. Magnet 14 can have any suitable shape, such as a polygonal or arcuate shape, and may be arranged at a location relative to inlet opening 16 effective to magnetically interact with a DEF fill nozzle inserted into inlet opening 16.

In some examples, such as the example shown in FIG. 1, the one or more sidewalls 20 defining inlet opening 16 can define a nozzle 22 projecting away from a remainder of reservoir body 12. Nozzle 22 may define a projecting spout, which may be easier to access when inserting a DEF fill nozzle into reservoir body 12.

Figure 2:
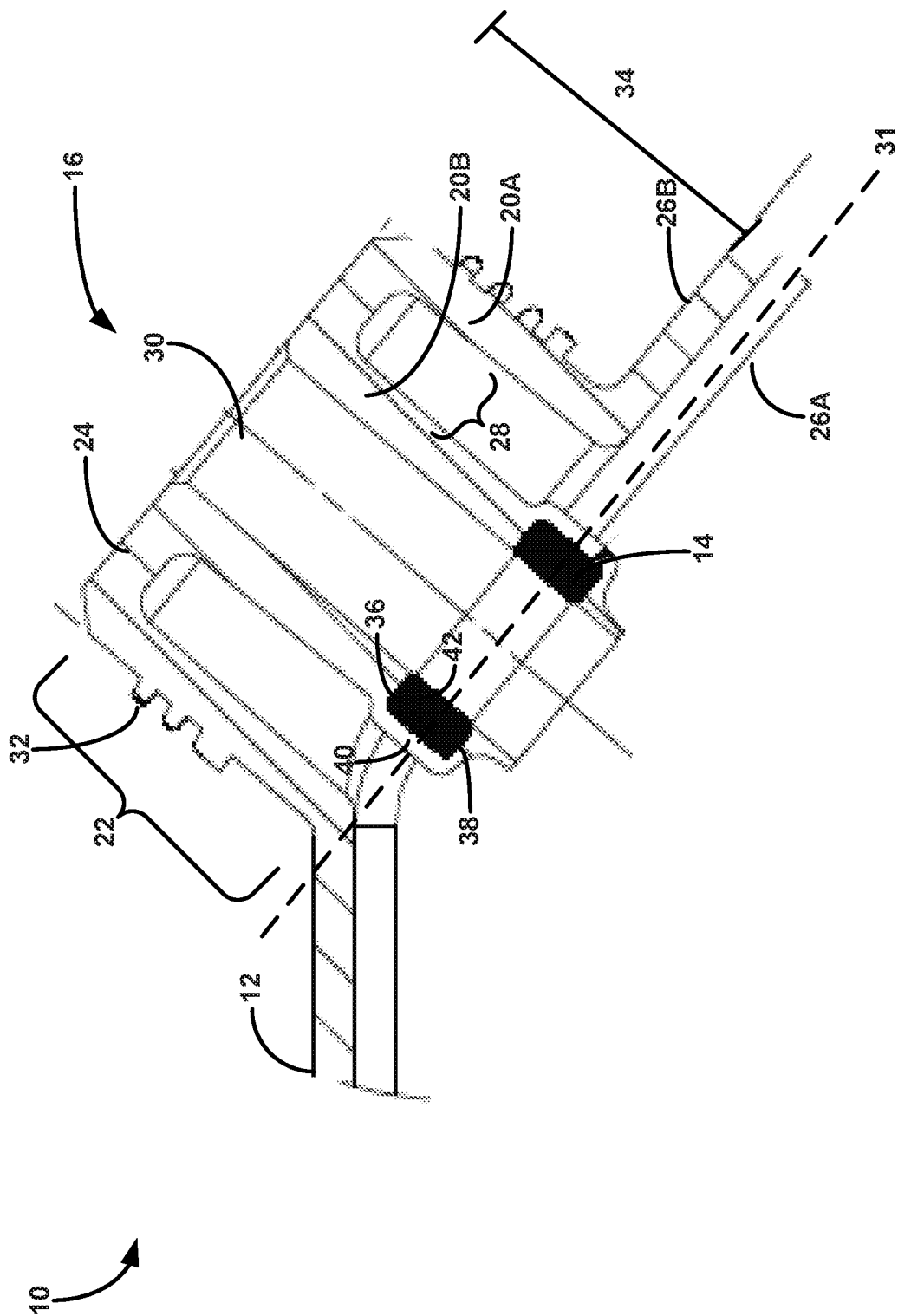
FIG. 2 is a detailed section view of the portion of the example reservoir of FIG. 1 taken along the A-line indicated on FIG. 1.

FIG. 2 is an exploded view of reservoir 10 taken along the A-section line indicated on FIG. 1. In the illustrated configuration, nozzle 22 of reservoir body 12 includes a first sidewall 20A defining an external perimeter of the nozzle, e.g., which may be exposed to an exterior environment outside of the reservoir. First sidewall 20A terminates in an outlet end face 24, which is illustrated as being parallel to a base wall 26 of reservoir body 12 from which first sidewall 20A extends. As illustrated, nozzle 22 also includes a second sidewall 20B defining a lumen extending into an interior of reservoir body 12. The lumen formed by second sidewall 20B is co-axial with external perimeter of the nozzle defined by first sidewall 20A about an axis 30. A void space 28 devoid of the material forming reservoir body 12 separates first sidewall 20A from second sidewall 20B. As a result, inlet opening 16 has a reduced cross-sectional area as compared to the cross-sectional area define by the external perimeter of nozzle 22. In other configurations, nozzle 22 may be formed of a single sidewall, one side of which is exposed to the exterior environment and the other side of which is exposed to the interior of reservoir body 12.

Independent of whether nozzle 22 is formed by a single sidewall or multiple sidewalls nested inside each other, the external perimeter of the nozzle may include threading 32. Threading can be used to screwably engage a cap on reservoir 10 to enclose inlet opening 16. Other mechanical fixation features can be used in addition to or in lieu of threading if a cap is desired to be removably affixed over inlet opening 16.

In FIG. 2, magnet 14 is illustrated as being integrated into second sidewall 20B. In particular, in the illustrated arrangement, magnet 14 is illustrated as being positioned closer to the distal end of the lumen formed by second sidewall 20B (extending into reservoir body 12) than the proximal end at outlet face 24. In some examples, magnet 14 is positioned at the distal most end of the lumen. In other examples, magnet 14 is offset from the distal most end of the lumen, such as a distance ranging from 1 mm to 20 mm, such as from 2 mm to 10 mm. Additionally, in FIG. 2, magnet 14 is positioned substantially co-planar with base wall 26 from which nozzle 22 projects (e.g., co-planar on plane 31). In other examples, magnet 14 may be offset relative to base wall 26, for example, recessed inwardly related to base wall 26 or outwardly offset relative to base wall.

As noted, reservoir body 12 can have a variety of different dimensions and configurations depending on the desired application. In the example of FIG. 2, nozzle 22 projects away from base wall 26. Base wall 26 defines a first side 26A facing an interior of reservoir body 12 and a second side 26B, opposite the first side, facing an exterior environment. In some examples, nozzle 22 projects away from base wall 26 a distance 34 ranging from 25 mm to 50 mm. Depending on the length of nozzle 22, a center of magnet 14 may be positioned a distance ranging from 30 mm to 55 mm from outlet face 24, such as from 35 mm to 50 mm, or from 40 mm to 45 mm.

To integrate magnet 14 into sidewall 20 (and, in particular for the example of FIG. 2, second sidewall 20B), the sidewall may be molded or otherwise formed about the magnet during fabrication of reservoir body 12. For example, magnet 14 may be positioned within a mold for forming reservoir body 12 at a location corresponding to the desired positon of the magnet in the finished product. Polymer can be introduced into the mold and distributed to conform to the shape of the mold, thereby forming reservoir body 12. In the process of distributing polymer about the mold, the polymer can surround magnet 14, thereby trapping the magnet in a sidewall of reservoir body 12 and forming a unitary structure in which the magnet is permanently incorporated into the reservoir body. In different examples, reservoir 10 can be fabricated using an injection molding technique, a blow molding technique, a compression molding technique, a rotational molding technique, or other suitable formation processing.

While the thickness of the one or more sidewalls 20 forming reservoir body 12 can vary depending on the design requirements of the reservoir, in some examples, the sidewall has a thickness ranging from 2 mm to 8 mm. The thickness of the one or more sidewalls forming reservoir body 12 can be substantially constant across the entirety of the structure (e.g., plus or minus 30 percent or less) or may vary. For example, the thickness of sidewall 20 may be less in the region surrounding first side 40 of magnet 14 than the remainder of reservoir body 12.

With reference to FIG. 2, magnet 14 can have a length extending from a first end 36 to a second end 38 and a thickness extending from a first side 40 of the magnet to a second side 42 of the magnet opposite the first side. Sidewall 20 of reservoir body 12 (and, in particular for the example of FIG. 2B, second sidewall 20B), can partially or fully surround and enclose magnet 14. For example, sidewall 20 may bound the first end 36 of the magnet, the second end 38 of the magnet, and the first side 40 of the magnet. Sidewall 20 may bound a portion of magnet 14 in that the sidewall may be molded to and in contact with the portion of the magnet, thereby forming a shape-indexed cavity in the sidewall in which the magnet resides.

In different examples, sidewall 20 may or may not bound second side 42 of magnet 14. For example, magnet 14 may be fully encased in the material forming sidewall 20. Alternative, a wall surface of magnet 14 may be substantially or entirely devoid of the material forming sidewall 20. The magnetic field strength of magnet 14 acting on a DEF fill nozzle inserted into opening 16 may be stronger if second side 42 is substantially devoid of sidewall material than if the magnet is full encased in the material. In configurations where second side 42 is substantially devoid of sidewall material, the second side 42 may be coplanar with an inner surface of the lumen formed by second sidewall 20B. Accordingly, the second side 42 and the inner surface of second sidewall 20B, collectively, can form a lumen extending from outside of reservoir body 12 to an interior of the reservoir body.

Figure 3:
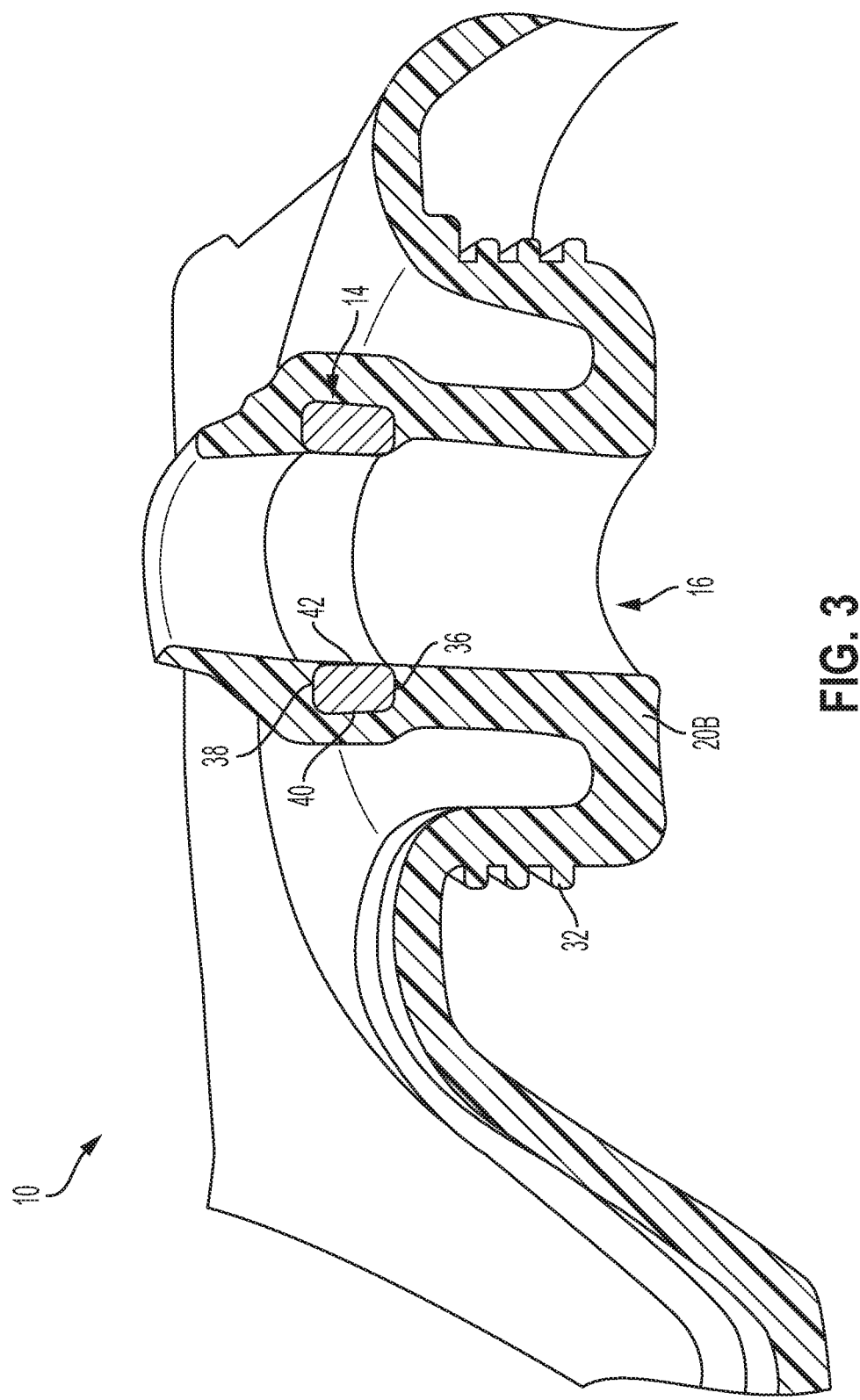
FIG. 3 is a sectional image showing an example configuration of a magnet that can be used in the example reservoir of FIG. 1.

FIG. 3 is a sectional image showing an example configuration of magnet 14 in reservoir 10. As shown in this example, sidewall 20B is molded over the first end 36 of the magnet, the second end 38 of the magnet, and the first side 40 of the magnet. Sidewall 20B extends over the edge between first end 36 and second side 42 and the edge between second end 38 and second side 42. However, second side 42 is substantially uncovered by the material forming sidewall 20B.

In configurations in which a side of magnet 14 is substantially or entirely devoid of sidewall material, at least the exposed side of the magnet can be coated with a coating providing enhanced corrosion resistance as compared to the uncoated magnet. As examples, magnet 14 (or at least an exposed side thereof) can be coated with an epoxy coating, plated with nickel, or have other corrosion resistant surface coating.

In general, magnet 14 may be formed of any suitable magnetic material. In applications where the magnet is exposed to elevated temperatures while being molded into reservoir body 12, the magnet may be formed of a material that maintains its magnetic strength through the heating process. For example, magnet 14 may be formed of a magnetic material that maintains its magnetic strength after being heated to a temperature of at least 150 degrees Celsius, such as a temperature ranging from 200 degrees Celsius to 300 degrees Celsius. The magnetic strength of the magnet after being molded into reservoir body 12 may be at least 75% of the strength before being molded into the reservoir, such as at least 90% of the strength, or at least 95% of the strength. In some examples, magnet 14 exhibits a remanence of at least 1.2 tesla (T), such as from 1.2 to 1.3 T in the finished reservoir. Additionally or alternatively, magnet 14 may exhibit a coercivity of at least 750 kA/m, such as from 800 kA/m to 900 kA/m in the finished reservoir. Example materials from which magnet 14 may be fabricated include neodymium, such as a neodymium-iron-boron, samarium-cobalt (SmCo), and aluminum nickel cobalt (AlNiCo). In some examples, magnet 14 includes dysprosium, which may improve the thermal stability/resistance of the magnet.

Figure 4:
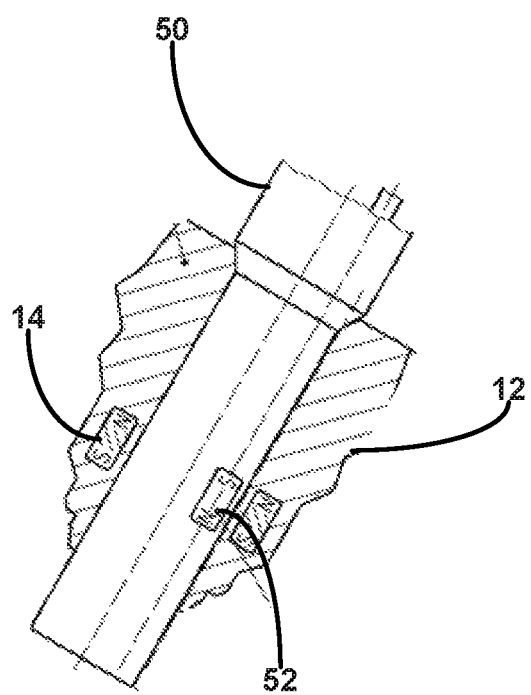
FIG. 4 is a sectional illustration of an example DEF fill nozzle inserted into a reservoir body.

In use, an operator can insert a DEF fill nozzle into opening 16 of reservoir 10. Magnet 14 can apply a magnetic force to a corresponding magnet carried by the fill nozzle, causing a valve in the DEF fill nozzle to open. FIG. 4 is a sectional illustration of an example DEF fill nozzle 50 inserted into reservoir body 12. As shown, DEF fill nozzle 50 includes a magnet 52, which can interact with magnet 14 integrated into the sidewall of reservoir body 12. The poles of magnet 14 and magnet 52 can be positioned in opposite directions, e.g., such that the magnetic forces of magnets 14 and 52 oppose each other as DEF fill nozzle 50 is inserted into reservoir body 12. In some configurations, magnet 14 has a north pole and a south pole and the magnet is positioned with the north pole pointing toward a terminal end of inlet opening 16 and the south pole pointing toward an interior of reservoir body 12.

Various examples have been described. These and other examples are within the scope of the following claims.

The invention claimed is:

1. A diesel exhaust fluid storage system comprising:
   a reservoir body configured to contain diesel exhaust fluid, the reservoir body including at least one sidewall defining an inlet opening through which diesel exhaust fluid is configured to be introduced into the reservoir body, wherein the reservoir body has an outlet opening through which diesel exhaust fluid is configured to be discharged from the reservoir body for supplying a diesel exhaust system, and the at least one sidewall defines a nozzle projecting away from a remainder of the reservoir body, and
   a magnet integrated into the at least one sidewall defining the inlet opening of the reservoir body, the magnet being positioned at a location that is co-planar with or recessed relative to the remainder of the reservoir body from which the nozzle projects.

2. The system of claim 1, wherein the reservoir body, including the at least one sidewall defining the inlet opening, is molded from a polymeric material to form a unitary structure, and the magnet is molded into the at least one sidewall.

3. The system of claim 1, wherein the at least one sidewall has a thickness ranging from 2 mm to 8 mm.

4. The system of claim 1, wherein
   the magnet has a length extending from a first end of the magnet to a second end of the magnet,
   the magnet has a thickness extending from a first side of the magnet to a second side of the magnet opposite the first side, and
   the at least one sidewall of the reservoir body bounds the first end of the magnet, the second end of the magnet, and the first side of the magnet.

5. The system of claim 4, wherein the second side of the magnet is substantially devoid of material forming the at least one sidewall.

6. The system of claim 5, wherein the second side of the magnet is substantially co-planar with an inner surface of the at least one sidewall such that second side of the magnet and the inner surface of the at least one sidewall, collectively, form a lumen extending from outside of the reservoir body to an interior of the reservoir body.

7. The system of claim 5, wherein at least the second side of the magnet is coated with a coating providing corrosion resistance, the coating being selected from the group consisting of an epoxy coating and nickel plating.

8. The system of claim 1, wherein the nozzle has an exterior perimeter that comprises threading configured to screwably engage a cap to enclose the inlet opening.

9. The system of claim 1, wherein the at least one sidewall defining the nozzle includes a first sidewall defining an external perimeter of the nozzle and terminating in an outlet end face of the nozzle and a second sidewall defining a lumen extending into an interior of the reservoir body in a direction co-axial with the external perimeter of the nozzle, a void space being provided between the first sidewall and the second sidewall.

10. The system of claim 9, wherein the magnet is integrated into the second sidewall adjacent an end of the second sidewall opposite the outlet end face of the nozzle.

11. The system of claim 1, wherein
   the reservoir body defines a base wall having a first side facing an interior of the reservoir body and a second side, opposite the first side, facing an exterior environment, and the nozzle projects away from the base wall a distance ranging from 25 mm to 50 mm.

12. The system of claim 1, wherein the magnet surrounds an entire perimeter of the inlet opening.

13. The system of claim 12, wherein the at least one sidewall defines a circular opening and the magnet has an annular shape, and the magnet with annular shape has an inner diameter ranging from 15 mm to 25 mm and outer diameter ranging from 16 mm to 40 mm.

14. The system of claim 1, wherein the magnet has a north pole and a south pole, and the magnet is positioned with the north pole pointing toward a terminal end of the inlet opening and the south pole pointing toward an interior of the reservoir body.

15. The system of claim 1, wherein the magnet is formed of a material selected to substantially maintain its magnetic strength after being heated to a temperature ranging from 200 degrees Celsius to 300 degrees Celsius.

16. The system of claim 1, wherein the magnet comprises a material selected from the group consisting of neodymium, dysprosium, and combinations thereof.

17. A diesel exhaust fluid storage system comprising:
   a reservoir body configured to contain diesel exhaust fluid, the reservoir body including at least one sidewall defining an inlet opening through which diesel exhaust fluid is configured to be introduced into the reservoir body, and the reservoir body having an outlet opening through which diesel exhaust fluid is configured to be discharged from the reservoir body for supplying a diesel exhaust system, and
   a magnet integrated into the at least one sidewall defining the inlet opening of the reservoir body, the magnet surrounding an entire perimeter of the inlet opening,
   wherein the at least one sidewall defines a circular opening and the magnet has an annular shape, and the magnet with annular shape has an inner diameter ranging from 15 mm to 25 mm and outer diameter ranging from 16 mm to 40 mm.

18. The system of claim 17, wherein the reservoir body, including the at least one sidewall defining the inlet opening, is molded from a polymeric material to form a unitary structure, and the magnet is molded into the at least one sidewall.

19. The system of claim 17, wherein the magnet is formed of a material selected to substantially maintain its magnetic strength after being heated to a temperature ranging from 200 degrees Celsius to 300 degrees Celsius.

20. The system of claim 17, wherein the magnet comprises a material selected from the group consisting of neodymium, dysprosium, and combinations thereof.

\* \* \* \* \*